Patented Apr. 22, 1952

2,593,818

UNITED STATES PATENT OFFICE 2,593,818

COLORED GLASS FIBER PRODUCT AND METHOD OF PRODUCING THE SAME

Jack H. Waggoner, Newark, Ohio, assignor to Owens-Corning Fiberglas Corporation, a corporation of Delaware No Drawing. Application June 1, 1949, Serial No. 96,614

11 Claims. (Cl. 117—46)

This invention relates to glass fiber products and more particularly to colored glass fibers and to methods for producing the same.

Full utilization of glass fibers in textile fabrics and related structure has not been realized and cannot be realized until suitable means are provided for permanently coloring glass fibers independently of the melt from which the fibers are formed. Many of the difficulties in coloring glass fibers stem from the perfectly smooth and inert surfaces of the fiber developed in forming. This coupled with the inertness of glass provides little anchorage for coloring matter or for a base in which suitable tinctional agents might be incorporated.

There are some resinous materials which are adherent to glass fiber surfaces under normal conditions, which materials might function as a colorable base, but even with these the bond is markedly weakened in the presence of high humidity or upon direct contact with water. This loss in bond strength apparently results from an intervening moisture layer which exists on the glass fiber surfaces and increases in concentration on the hydrophylic glass fiber surfaces under high humidity condition. Thus both physical and chemical forces, inherent in the natural glass fiber, are unfavorable to the employment of the common techniques for coloring or printing on fabrics formed of the natural fibers such as wool, silk, linen or synthetic organic fibers of the rayon, nylon, vinyon, etc.

It is an object of this invention to produce colored glass fibers and to provide a method for manufacturing the same.

Another object is to produce glass fibers that are permanently colored without interfering with other desirable characteristics of the fiber and it is a related object to produce colored glass fibers having in combination one or more improved properties, such as better hand and feel, draping qualities characteristic of the finest silks and woolens, increased abrasion resistance, resistance to slippage of the weave, and sheen or luster controlled to a desired degree.

A further object is to provide on the glass fiber surfaces an inorganic coloring oxide thermally reacted to develop a high affinity for the glass fiber surfaces and which, in addition, functions as a bulking agent, an anti-slip agent and as a delustering agent.

I have succeeded by a new and novel method to provide inorganic coloring compounds that are seemingly integrated by reaction with the glass fiber surfaces such that it is not affected by water and is capable of resisting abrasive forces to which the fibers might be subjected as an incidence to normal handling. The coloring product that is formed appears as colloidal particles which are so uniformly distributed over all of the fiber surfaces as to appear as a continuous film. The coloring substances are also instrumental in improving the flexibility, feel or hand of the resulting fabric. This is in contrast to the usual increased stiffness that characterizes the application of coatings to glass fibers and fabrics formed therefrom.

In carrying out my invention glass fibers are coated with one or more coloring metal oxides, preferably in finely divided or colloidal form and then the coated fibers are treated at an elevated temperature to generate a new and strong bond between the oxide particles and the glass fiber surfaces. The permanent type of bond developed by such thermal treatment militates against subsequent removal of the coloring products by elements or forces to which the fibers are exposed incident to normal handling. The high affinity of the coloring substances for the glass fiber surfaces developed by heat treatment may result from a type of molecular rearrangement or physico-chemical forces may effect a co-ordination of the particles with the glass fiber surfaces. It may respond to a reaction of the oxide metal particles with the groupings predominating on the glass fiber surfaces to yield a new reaction product. Whatever the reason, the affinity of the oxides for the glass fiber surfaces following heat treatment is greatly increased over the degree secured by the mere impregnation of the glass fibers with the same or other colloidal oxides without reaction at elevated temperatures, as illustrated by the ease with which silica is removed when applied as a delustering agent.

By the use of coloring oxides corresponding shades of a permanent character are imparted to the glass fibers. By the use of various combinations of coloring oxides, different shades and color blends may be secured. By the variation in reaction temperatures or temperature of heat treatment various shades of colors may be developed by a single metal oxide or combination thereof. This latter phenomenon corresponds to the color reactions which follow the tempering of steel parts as they travel through a tempering cycle, the color changes occurring in what is believed to be the oxide surface coating. When the reaction between the metal oxides and the glass fiber surfaces leaves a substantially colorless product, permanent color can still be developed because it appears that the resulting fiber surfaces provide sufficient physical anchorage for conventional coloring agents, such as dyes, which may then be applied by techniques common in the textile trade.

Treatment to deposit the metal oxide and to produce the desired reaction product may be carried out with glass fibers of the staple type or of the continuous type. It may be achieved with yarns or fabrics formed of staple or continuous glass fibers or mixtures thereof. It may also be carried out with glass fibers in combination with other fibers capable of withstanding the rigorous conditions of heat treatment such as with asbestos. Treatment may be achieved conjointly with the fiber forming process or, preferably, by the treatment of the fibers subsequent to their formation, such as after the fibers have been processed into yarns or cloth. It may be carried out with fibers that have been sized during their manufacture with conventional materials, such as gelatin, starch, or organo silicon compounds. Treatment may be carried out with fibers from which the size has been removed by a water or solvent wash or by heat treatment. Thus, coloring of glass fibers may be adapted to various coloring techniques such as roller printing or screen printing, processes which heretofore have been difficult to use with glass fiber fabrics.

Representative of the materials which may be used are the coloring water insoluble metal oxides such as the oxides of chromium, iron, nickel, manganese, copper, bismuth, cobalt, uranium, lead, vanadium, cadmium, silver selenium, etc. Relatively colorless metal oxides, such as the oxides of zinc, tin, aluminum, zirconium, titanium and the like may also be used alone or in combination with the coloring oxides. It is often desirable to employ a combination of coloring and colorless oxides to develop desired shades, while the additional oxides provide higher concentration of colloidal materials to yield improved bulking, and anti-slip or delustering characteristics.

Application of the metal oxides in finely divided or colloidal form is preferably made from suspension or dispersion in aqueous or solvent medium. For conventional methods of application such as by spray coating, roller coating, dipping, padder rolls, flow coating and the like, the treating composition may be formulated to contain from 0.5 to 25 percent by weight metal oxide or oxides.

Excellent results are secured when the suspension or dispersion of the metal oxide is stabilized with a soap of a metal having coloring oxide. The use of such metallic soap as a vehicle into which the coloring oxide may be ground results in better penetration onto the fiber surfaces and the color concentration on the fiber is augmented by that amount of additional coloring oxide which is left by the soap upon heat treatment. At heat treating temperature, the organic component of the soap is driven off, leaving the metallic portion as the coloring oxide or as a coloring reaction product on the glass fiber surfaces. The better wetting or penetration characteristics of a treating compositon constituted with such metallic soaps makes more practical the technique of decorating glass fibers and fabrics formed therefrom by the processes of roller coating or screen printing. Suitable metallic soaps are constituted of the metallic component previously described as the cation and the radical of fatty acids, such as stearic, palmitic, oleic, etc. as the anion. The soap may also be in the form of napthenates, benzoates and other derivative metallic salts of or carboxylic acids. Usually the soap is present in amounts ranging from 2–20 percent by weight of the metal oxide.

The maximum temperature for effecting the desired thermal reaction of the colloidal oxide particles on the glass fiber surfaces is limited only by the temperature at which the fibers are fused together. For most fibers, such as fibers formed of borosilicate glass, the preferred temperature is about 1200–1250° F. The minimum temperature, which it is advantageous to employ is usually above 600° F. but on occasion may go as low as 450° F. Between these temperatures, various time and temperature combinations may be used, such as 3 to 5 minutes at 600° F. or 2–5 seconds at 1250° F. Under the more severe of these temperature conditions, say from 1 to 2 minutes at 900° F. or 2–5 seconds at 1200° F., a certain amount of weave setting is effected wherein the fibers while in yarn or fabric form are relaxed and are permanently set in their twisted or woven relation. This gives the textile the hand or feel desired for most decorative or textile use. Weave setting and fiber relaxation of the type secured is greatly responsible for the excellent crease and wrinkle resistance of the fabric and for the characteristics which enable the fabric to be draped in soft and rippling folds, characteristic of the finest silks and woolens.

It is common practice to follow heat treatment with a treatment to apply a protective coating or lubricant on the glass fiber surfaces. This step is desirable when heat treatment is capable of removing the size and weave setting the fibers.

By way of illustration, but not by way of limitation, the following describes the steps for carrying out this invention:

*Example 1*

A bundle of glass fibers in strand or yarn form is drawn through a bath containing 5 percent by weight of iron oxides ($F_2O_3$) or ($Fe_3O_4$) suspended in aqueous medium. The bath may be formed by water dilution of a solvent or water paste of the oxide ground into 5–10 percent of its weight of a metallic soap, such as iron stearate. The impregnated bundle of fibers may first be dried or it may be passed directly through a heating zone where it is exposed to a temperature of 600° F. for five minutes to set the coloring compounds on the glass fiber surfaces. The heat also acts to drive off the organic component of the soap leaving the metal as the corresponding oxide or coloring reaction product which blends with the coloring compounds previously described. By this treatment, a characteristic ecru shade is developed on the glass fiber surfaces. Other color gradations may however, be secured by exposure to higher temperatures or by exposure at the same temperature for a longer period of time.

*Example 2*

A fabric woven of glass fibers is fired at 600° F. to burn off the size and then it is impregnated in a padder with a 2 percent dispersion of nickel oxide in water. Upon heat treatment for five seconds at 1150° F., the nickel oxides are converted from an original bluish-green color to a greenish-yellow shade by coloring particles having a strong affinity for the glass fiber surfaces. The heat of reaction is generally sufficient to set the weave or relax the fibers to the extent that they thereafter are wrinkle-proof and the fabric exhibits good "hand" and drape.

Excellent results are secured when the fabric subsequent to heat treatment is further processed by the addition of size or lubricant which may include the ordinary starch, sugar, gelatine, oil, aliphatic amine and like material constitutes an organo silicon compound, such as an organo silicon fluid of the type dimethyl polysiloxane (DC 200 oil), diphenyl polysiloxane, diethyl polysiloxane (DC400 oil), etc. The diluent may be removed by exposure when the sized fabric is baked at 600° F. to react the organo silicon and further to relax the fibers.

As previously pointed out the desired color may be developed by proper selection of metal oxides and metallic soaps and by selective control of the temperature of heat treatment. For example, the following lists some of the colors which may be developed by substitution and heat treatment of the following metal oxides and combination thereof for the metal oxides employed in the foregoing examples.

| Oxide | Color |
| --- | --- |
| Chromium | greenish. |
| Iron | pink to ecru. |
| Nickel | bluish luster. |
| Manganese | pink to purple. |
| Copper | gunmetal. |
| Bismuth | grey. |
| Cobalt | blue. |
| Uranium | yellowish. |
| Lead | blue. |
| Vanadium | yellow to brown. |
| Cadmium | reddish. |
| Silver | yellow to grey. |
| Selenium | pink to grey. |
| Chromium-iron-zinc | yellow-brown. |
| Cobalt-chromium | green-blue to violet-blue. |
| Cobalt-chromium-iron | brown-black. |
| Copper-chromium | blue-black. |
| Cobalt-chromium | turquoise. |
| Chromium-tin | pink. |
| Chromium-Titanium | yellow. |
| Lead-Antimony | yellow to ivory. |
| Vanadium-tin | yellow. |

Delustering, anti-slip and bulking agents may be provided on the glass fiber surfaces in relatively high concentration by the simple expedient of loading the treating composition with oxides that yield coloring or white colloidal reaction products upon heat treatment. Additions of as much as 20 percent colloidal silicon oxides or silicates and the like may be made in the treating composition further to bulk up the fibers in the fabric. Zinc sulphate and the like, when added, imparts fluorescence to the treated glass fiber surfaces.

It will be understood that the amount of coloring oxides, other oxides and soaps may vary over a wide range and that the intensity of color developed will depend on the amount of coloring oxides and reaction products deposited on the glass fiber surfaces. However, it is undesirable to load the fibers beyond that portion capable of harmfully affecting the characteristics of the fibers as a textile material.

It will be understood that numerous changes may be made in the ingredients, their combination and proportion in the treating material and the conditions and methods of treatment on the glass fiber surfaces without departing from the spirit of the invention, especially as defined in the following claims.

What is claimed is:

1. The method of coloring glass fibers comprising the steps of coating the glass fibers to form a layer thereon of colored metal oxides in finely divided form, then heat treating the coated fibers for a time ranging from 2 seconds at a temperature slightly below the fusion temperature for the glass composition of which the fibers are formed to about 5 minutes at 600° F. to set the colored oxides on the glass fiber surfaces.

2. The method as claimed in claim 1 which includes the additional step of coating the fibers with a polysiloxane size after the heat treating step.

3. The method as claimed in claim 1 in which the coating applied to the glass fiber surfaces has incorporated therein up to 20 percent colorless metal oxides in finely divided form.

4. The method of coloring glass fibers comprising coating the glass fibers with a composition containing from 5-25 percent by weight of colored metal oxides in finely divided form, subjecting the treated fibers to a temperature ranging from slightly below the fusion temperature for the glass composition of which the fibers are formed to 600° F. for a time ranging from a few seconds at the higher temperature to 5 minutes at the lower temperature.

5. The method of coloring glass fibers comprising coating the glass fibers with a composition containing 5-25 percent by weight of colored metal oxides in finely divided form and an organo metallic soap in an amount ranging from 2-20 percent by weight of the colored metal oxides and capable of producing colored reaction products upon decomposition at elevated temperature on the glass fiber surfaces, and subjecting the treated fibers to a temperature ranging from 600° F. to slightly below the fusion temperature for the glass composition of which the fibers are formed for a time ranging from 5 minutes at the lower temperature to a few seconds at the higher temperature.

6. The method of coloring glass fibers comprising coating the glass fibers with a composition containing 5-25 percent by weight colored metal oxides in finely divided form, and subjecting the treated fibers to a temperature ranging from 800-1250° F. for a time ranging from 2 seconds at the higher temperature to about 120 seconds at the lower temperature to integrate the colored oxides with the glass fiber surfaces.

7. The method of coloring glass fibers comprising coating the glass fibers with a composition containing 5-25 percent by weight colored metal oxides in finely divided form, subjecting the treated fibers to a temperature ranging from 800-1250° F. for a time ranging from 2 seconds at the higher temperature to about 120 seconds at the lower temperature to integrate the colored oxides with the glass fiber surfaces, and then applying a size onto the heat treated fibers.

8. A colored glass fiber product produced by the method of claim 1.

9. A colored glass fiber product produced by the method of claim 3.

10. A colored glass fiber product produced by the method of claim 5.

11. A colored glass fiber product produced by the method of claim 7.

JACK H. WAGGONER.

(References on following page)

REFERENCES CITED

The following references are of record in the file of this patent:

UNITED STATES PATENTS

| Number | Name | Date |
|---|---|---|
| 537,245 | Stock et al. | Apr. 9, 1895 |
| 2,278,207 | Mathes | Mar. 31, 1942 |
| 2,392,805 | Biefeld | Jan. 15, 1946 |
| 2,393,530 | Harris | Jan. 22, 1946 |
| 2,444,347 | Greger et al. | June 29, 1948 |

FOREIGN PATENTS

| Number | Country | Date |
|---|---|---|
| 532,596 | Great Britain | Jan. 28, 1941 |
| 559,068 | Great Britain | Feb. 2, 1944 |

OTHER REFERENCES

Journal of the American Ceramic Society, Feb. 1, 1949, page 38.